3,400,140
SULFURIZED OXYMOLYBDENUM ORGANOPHOSPHORODITHIOATES AND PROCESS THEREFOR

Eugene V. Rowan, Rowayton, and Homer H. Farmer, Westport, Conn., assignors to R. T. Vanderbilt Company, Inc., New York, N.Y., a corporation of New York
No Drawing. Filed Oct. 28, 1965, Ser. No. 505,451
11 Claims. (Cl. 260—429)

This invention is concerned with molybdenum compounds. More particularly, it relates to sulfurized oxymolybdenum organophosphorodithioates.

In the past, numerous compounds containing molybdenum have been prepared. These molybdenum compounds have had oxygen atoms or sulfur atoms and some molybdenum compounds have had phosphorodithioate radicals.

It has now been discovered that certain new molybdenum compounds are effective extreme pressure agents and protect moving metal surfaces against wear. These molybdenum-containing compounds have the following generic structure:

$$[(RO)_2PS-S]_2Mo_2S_2O_2$$

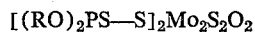

wherein R is an alkyl, cycloalkyl, aryl or alkaryl group having 1 to 30 carbon atoms. If R is an alkyl group, the preferred number of carbon atoms is 1 to 20 and the especially preferred number of carbon atoms is 3 to 8. If R is an aryl group, the preferred number of carbon atoms is 6 to 26, i.e., phenyl and alkyl-substituted phenyl groups wherein the alkyl substituent contains 1 to 20 carbon atoms, such as 4 to 9 carbon atoms. The compounds, however, have only one phosphorodithioate radical per molybdenum atom.

In the present invention, the compounds may be prepared by dissolving molybdic oxide in a solution of alkali metal hydroxide, magnesium hydroxide, beryllium hydroxide or ammonium hydroxide and by incorporating subsequently an approximately equivalent amount, based on hydroxide, of a strong mineral acid, such as sulfuric acid. An organophosphorodithioic acid reactant may be separately prepared by treating a monohydric alcohol or phenol with phosphorus pentasulfide in the mole ratio of 4:1. The phosphorodithioic acid reactant is then added to the aforementioned molybdate solution with subsequent finishing operations to form a sulfurized oxymolybdenum organophosphorodithioate.

It is important herein to heat the mixture of phosphorodithioic acid and molybdate solution at the reflux temperature, e.g., from about 85° to 100° C. The reaction time is generally 1 to 5 hours.

It is also important herein to use 2 mols of phosphorodithioic acid reactant for each mol of molybdate reactant to obtain a maximum yield of the product of this invention having one phosphorodithioate radical per molybdenum atom. No catalyst is required for the reaction. Water is a suitable solvent but other inert solvents may be present, such as a low viscosity aromatic base oil.

The reaction product, i.e., sulfurized oxymolybdenum organophosphorodithioate, may be solid or liquid depending on the organic radical in the phosphorodithioic acid reactant. If the molybdenum-containing product is a solid, it is recovered by filtration. If the molybdenum-containing product is a liquid, it is recovered by filtering out any solid by-products and by distilling to remove the solvent.

A compound of the invention may be employed as a lubricant, per se. This includes using it as an antiwear agent or as an extreme pressure agent. A compound of the invention also may be employed as an additive in any lubricating oil or grease. As an additive, the compound is generally used in a minor amount, e.g., 0.2% to 20%, preferably 0.2% to 10%. Therefore, a known petroleum-based lubricant, such as turbine oil, other light oils, SAE 90 gear oil and other heavy oils, or a known synthetic lubricant, such as esters, polyethers and silicones, may have therein a molybdenum-containing compound within the scope of the present invention. Besides the aforementioned molybdenum compound, the lubricating oil or grease may contain conventional additives, such as thickening agents for the production of lubricating greases (e.g., clay, other pigments, alkali metal soaps, alkaline earth metal soaps or other soaps), corrosion inhibitors, antioxidants, antirust agents, viscosity improvers, pour point depressants, detergents, other extreme pressure agents, other antiwear agents and the like.

Thus, in accordance with this invention, new sulfurized oxymolybdenum organophosphorodithioate compounds have been formed with one phosphorodithioate radical for each molybdenum atom. These compounds have antiwear and extreme pressure properties and act as antioxidants when formulated in lubricating oils and greases. Furthermore, the compounds of the invention have the same properties when used per se on rubbing metal surfaces.

The following examples are submitted to illustrate but not to limit this invention. Unless otherwise indicated, all parts and percentages in the specification and claims are based upon weight.

EXAMPLE I

Sulfurized oxymolybdenum di-isopropylphosphorodithioate was prepared by placing pure molybdic oxide, 72 grams (0.5 mole), and 300 ml. of water in a 1-liter, 3-necked flask equipped with stirrer, thermometer and reflux condenser. Sodium hydroxide, 35 grams of 50% solution (0.44 mole), was then added and the mixture was heated to effect solution. Sulfuric acid, 21.7 grams of 96% acid (0.21 mole), was added subsequently and the mixture was cooled below 50° C. This was followed by the addition of di-isopropylphosphorodithioic acid, 268 grams of 80% active material in a low viscosity aromatic base oil (1.0 mole). The resulting mixture was heated at reflux (85–95° C.) for two hours, cooled and filtered. The filter cake was washed successively with water, methanol and hexane to yield 177.0 grams of a yellow solid. When recrystallized from hexane, the sulfurized oxymolybdenum di-isopropylphosphorodithioate melted at 140–141° C. and had the following analysis.

Calc. for $C_{12}H_{28}P_2S_6O_6Mo_2$: C, 20.17%; H, 3.95%; S, 26.92%. Found: C, 20.52%; H. 3.94%; S, 25.52%.

The infrared spectrum of sulfurized oxymolybdenum di-isopropylphosphorodithioate showed the following adsorption maxima.

| Microns: | Strength |
|---|---|
| 3.45 | Strong. |
| 6.85 | Moderate. |
| 7.29 | Do. |
| 8.50 | Do. |
| 9.10 | Weak. |
| 10.27 | Very strong. |
| 11.20 | Moderate. |
| 13.07 | Moderate to strong. |
| 13.40 | Moderate. |
| 14.00 | Weak to moderate. |

EXAMPLE II

Sulfurized oxymolybdenum di-isobutylphosphorodithioate was prepared from pure molybdic oxide, 36 grams (0.25 mole), in 100 ml. water dissolved in 17.5 grams of 50% sodium hydroxide solution (0.22 mole) as described for Example I. The mixture was treated with 10.52 grams of 96% sulfuric acid (0.11 mole), and the solution was cooled below 50° C. before adding 181.0 grams (0.50 mole) of di-isobutylphosphorodithioic acid. The mixture therefrom was heated for two hours at 95–100° C., cooled and poured into a separatory funnel. The oily layer was separated, washed with water and allow to stand overnight. The solidified product was slurried in methanol and filtered, yielding a yellow solid. After recrystallization from hexane, 50 grams of purified sulfurized oxymolybdenum di-isobutylphosphorodithioate were obtained which melted at 95–96° C. and which has an analysis as follows.

Calc. for $C_{16}H_{36}P_2S_6O_6Mo_2$: C, 24.94%; H, 4.71%; P, 8.04% S, 24.96%; Mo 24.90%. Found: C, 25.19%; H, 4.65%; P, 8.00%; S, 24.87%; Mo 24.26%.

The infrared spectrum of sulfurized oxymolybdenum di-isobutylphosphorodithioate showed the following absorption maxima.

| Microns: | Strength |
|---|---|
| 3.45 | Strong. |
| 6.85 | Moderate to strong. |
| 7.20 | Moderate. |
| 9.80 | Strong ⎫ |
| 10.05 | Very strong ⎬ Triplet. |
| 10.27 | Strong ⎭ |
| 11.88 | Moderate. |

EXAMPLE III

By following the procedure of Example I, sulfurized oxymolybdenum di-(2-ethylhexyl)phosphorodithioate was formed from a mixture of pure molybdic oxide, 50 grams (0.35 mole), and 75 ml. of water which was treated with 24.2 grams of 50 sodium hydroxide solution (0.30 mole) with subsequent heating to effect solution. Sulfuric acid, 14.6 grams of 96% acid (0.14 mole), was added and the solution was cooled below 50° C. After adding 245 grams (0.69 mole) of di-(2-ethylhexyl)phosphorodithioic acid, the resulting mixture was heated for five hours at 95–100° C. and was then poured into a separatory funnel. The oily layer was seperated, washed with water and dissolved in hexane. The hexane solution was then washed with water and the solvent was evaporated to yield 265 grams of brown, liquid sulfurized oxymolybdenum di-(2-ethylhexyl)phosphorodithioate which was tested without further purification. The infrared spectrum of the sulfurized oxymolybdenum di-(2-ethylhexyl)phosphorodithioate showed absorption maxima as follows.

| Microns: | Absorption |
|---|---|
| 3.45 | Strong. |
| 6.85 | Moderate to strong. |
| 7.25 | Moderate. |
| 8.7 | Weak to moderate. |
| 10.10 | Very strong. |
| 10.55 | Moderate. |
| 12.30 | Weak. |
| 13.9 | Do. |

EXAMPLE IV

The preparation of sulfurized oxymolybdenum di-(p-tertiary-butylphenyl)phosphorodithioate was accomplished by placing pure molybdic oxide, 72 grams (0.5 mole), and 500 ml. water in a 2-liter, 3-necked flask equipped with stirrer, thermometer and condenser. Then 35 grams of 50% sodium hydroxide solution (0.44 mole) were added and the mixture therefrom was heated to effect solution. Sulfuric acid, 21.7 grams of 96% acid (0.21 mole), was added and the resulting solution was cooled below 50° C. before adding 372 grams (1.0 mole) of di-(p-tertiary-butylphenyl)phosphorodithioic acid. This mixture was refluxed for two hours, cooled and filtered to yield 70 grams of a brown solid. When recrystallized several times from toluene, a tan product, sulfurized oxymolybdenum di - (p - tertiary-butylphenyl)-phosphorodithioate, was obtained. This product melted at 225–227° C. and had the following analysis.

Calc. for $C_{40}H_{52}P_2S_6O_6Mo_2$: C, 44.68%; H, 4.88%; S, 17.90%; mol. wt. 1075. Found: C, 44.61%; H, 4.87%; S, 18.06%; mol. wt. 1006.

The molecular weight, determined by the vapor pressure method, indicated that the product existed largely in dimer form rather than as the monomer. The infrared spectrum of sulfurized oxymolybdenum di-(p-tertiary-butylphenyl)-phosphorodithioate showed the following absorption maxima.

| Microns: | Absorption |
|---|---|
| 3.45 | Strong. |
| 6.83 | Moderate to strong. |
| 7.27 | Moderate. |
| 8.4 | Do. |
| 8.63 | Strong. |
| 10.27 | Moderate to strong. |
| 10.60 | Strong. |
| 10.90 | Do. |
| 11.85 | Moderate. |
| 12.02 | Strong. |
| 12.72 | Moderate. |
| 14.90 | Weak to moderate. |

EXAMPLE V

In the preparation of sulfurized oxymolybdenum di-(nonylphenyl)phosphorodithioate, pure molybdic oxide, 72 grams (0.5 mole), was placed in 500 ml. water and dissolved by 35 grams of 50% sodium hydroxide solution (0.44 mole) according to the method described in Example IV. Sulfuric acid, 21.7 grams of 96% acid (0.21 mole), was added and the solution was cooled below 50° C. before adding 534 grams of di-(nonylphenyl)phosphorodithioic acid (1.0 mole). The resulting mixture was heated for two hours at 100° C. and then cooled. A brown oily layer was separated and washed first with water and then with methanol. The oil was dissolved in hexane and filtered, and the solvent was evaporated to yield 521 grams of crude brown, liquid sulfurized oxymolybdenum di-(nonylphenyl)phosphorodithioate.

Sulfurized oxymolybdenum di-n-propyl and di-n-amyl-phosphorodithioates were prepared similarly.

EXAMPLE VI

Several sulfurized oxymolybdenum organophosphorodithioates were prepared in the same manner as described in the previous examples except that the organo group was varied as required. Heat stability tests were performed by placing separate 100 ml. portions of low viscosity index, high aromatic content oil, copper and iron wire oxidation catalysts and 5% by weight of a different sulfurized oxymolybdenum organophosphorodithioate in 250 ml. beakers and placing the beakers in a circulating air oven at 250° F. The beakers were checked daily for sludge formation and evolution of hydrogen sulfide and the time of breakdown was noted as indicated in Table I herebelow.

TABLE I

| Organo group: | Additive life (days) |
|---|---|
| n-Propyl | 1 |
| Iso-propyl | 1 |
| Iso-butyl | 3 |
| n-Amyl | 1 |
| 2-ethylhexyl | 3 |
| Nonylphenyl | a 21 | a Ran 14 days at 250° F., then 7 days at 300° F. After termination at 21 days, the oil was still in fair condition.

This example demonstrates that the compounds of the invention have acceptable heat stability and that the heat stability of sulfurized oxymolybdenum di-(nonylphenyl)-phosphorodithioates was especially outstanding.

EXAMPLE VII

Timken tests in lubricating grease were performed with several compounds of Examples I, III and V. Separate portions of a lithium 12-hydroxystearate grease containing no additive other than this thickening agent were combined with each sulfurized oxymolybdenum organophosphorodithioate in varying proportions. Sulfurized oxymolybdenum di-isopropylphosphorodithioate was tested at 2% based on the weight of the composition and sulfurized oxymolybdenum di-(2-ethylhexyl)- and di-(nonylphenyl)phosphorodithioates were tested at both 2% and 4%. A control without an organophosphorodithioate was also tested.

The grease compositions were subjected to the Timken Endurance Test which is a recognized test of antiwear properties in the Timken Lubricant Tester in which a hardened steel ring smeared with 0.5 gram of the grease composition was rotated at 800 r.p.m. while a hardened steel block was pressed against it by a system of weights and levers. A ten-pound weight was used, and the test was run for a maximum of eight hours or until seizure occurred. The time to failure was recorded in hours.

These grease compositions were also subjected to the Timken Load Bearing Test by varying the weights used, beginning with a 20 pound load and raising it by 10-pound increments, to determine the highest weight which did not produce scoring of the block in ten minutes of running time. This weight was recorded as the passing or O.K. load, a well-known measure of the load-carrying capacity of a lubricant.

The results of these tests are shown in Table II.

TABLE II

| Organo group | Endurance test | | O.K. Load (lbs.) |
|---|---|---|---|
| | Hours | Scar width (mm.) | |
| Isopropyl 2% | 8 | [1] 1.0 | |
| 2-ethylhexyl: | | | |
| 2% | [2] 8, 8 | 1.1, 1.1 | 20 |
| 4% | 8 | 1.1 | 60 |
| Nonylphenyl: | | | |
| 2% | [2] 8, 8 | [3] 1.1 | |
| 4% | 8 | 1.3 | |
| Control | 1/60 | ([4]) | 5 |

[1] Very light scoring.
[2] Duplicate tests.
[3] Scored.
[4] Seized.

It is evident from this example that the compounds of the invention are antiwear agents and the di-(2-ethylhexyl) derivative is a good extreme pressure agent in lubricating grease.

EXAMPLE VIII

Timken tests in oil were also performed with sulfurized oxymolybdenum di-(2-ethylhexyl)phosphorodithioate of Example III, adding 2% to 4% based on the weight of the composition to separate portions of an SAE 90 mineral lubricating oil having a Saybolt viscosity of 87 seconds at 210° F. and 1030 seconds at 100° F. and a viscosity index of 91. A composition containing no sulfurized oxymolybdenum organophosphorodithioate served as untreated control.

These compositions were subjected to the Timken Load Bearing Test as described in Example VII but modified by flooding the rotating ring and the block it presses against with the test lubricant, which is maintained at 100° F., and beginning with a 20-pound load.

The O.K. or passing loads in the lubricating oil are indicated in Table III.

TABLE III

Organo group:
  2-ethylhexyl—                            O.K. load (lbs.)
    2% ------------------------------------ 20
    4% ------------------------------------ 70
  Control --------------------------------- 7

This example also demonstrates that sulfurized oxymolybdenum di-(2-ethylhexy)phosphorodithioate is an excellent pressure agent when present in sufficiently high concentration.

EXAMPLE IX

Four-Ball tests in oil were performed with the base oil described in Example VIII containing 2%, based on the weight of the composition, of sulfurized oxymolybdenum organophosphorodithioates. These compositions and a control were tested in the Shell Four-Ball Lubricant Tester, in which a 0.5-inch steel ball was rotated in contact with three similar balls which were clamped in a stationary position to provide the rotating ball with three points of contact.

For a wear test, a load of 40 kg. was applied to the ball, rotating at 1800 r.p.m., for one hour. The average diameters of the wear scars on the three stationary balls were measured and were reported in millimeters.

For an Extreme Pressure Test (weld test) using the same equipment, increasing loads were applied for one minute each to the rotating ball, and the load at which the balls weld together was determined.

The Mean Hertz Load Test, described in Federal Test Standard 791a, Method 6503, an accepted measure of extreme pressure and antiwear properties, used the same equipment. A range of loads was applied for ten seconds each until welding occurred. The wear scars on the balls were measured and the mean load at weld was calculated from the size of the scars.

The results of these tests are listed in Table IV herebelow.

TABLE IV

| Organo group | Wear test (mm.) | Extreme pressure test (kg.) | Mean Hertz load (kg.) |
|---|---|---|---|
| 2-ethylhexyl: | | | |
| 2% | 0.51 | 190 | 35 |
| 4% | | 205 | 44 |
| Nonylphenyl: | | | |
| 2% | 0.67 | 155 | 22 |
| 4% | | 170 | 35 |
| Control | ([1]) | 105 | 18 |

[1] Welds in 10 sec.

It is evident from Table IV that the sulfurized oxymolybdenum organophosphorodithioates as additives exhibit good extreme pressure and antiwear properties.

EXAMPLE X

Base grease compositions of Example VII containing varying amounts of five sulfurized oxymolybdenum organophosphorodithioates were tested in the Shell Four-Ball Tester by the Extreme Pressure Test (weld test) of Example IX. In addition, two of these materials, the di-(2-ethylhexyl) and the di-(nonylphenyl) derivatives, at 2% in the composition were subjected to the Mean Hertz Load Test of Example IX. A composition containing no sulfurized oxymolybdenum organophosphorodithioate served as untreated control.

The results of these tests are summarized in Table V.

TABLE V

| Organo group | Extreme pressure test (kg.) | Mean Hertz load (kg.) |
|---|---|---|
| i-Propyl, 2% | 265 | |
| i-Butyl, 2% | 230 | |
| 2-ethylhexyl: | | |
| 2% | 195 | 29 |
| 4% | 235 | |
| p-Tertiary-butylphenyl, 2% | 290 | |
| Nonylphenyl: | | |
| 2% | 175 | 29 |
| 4% | 215 | |
| Control | 115 | 18 |

The results of the above test also show that the sulfurized oxymolybdenum organophosphorodithioates as additives exhibit excellent extreme pressure and antiwear properties.

EXAMPLE XI

The Norma-Hoffman Test, ASTM D–942, in which twenty grams of grease distributed between five glass dishes is heated at 210° F. in a bomb filled with oxygen initially at a pressure of 110 p.s.i.g., was carried out with certain grease compositions of Example VII. The pressure was read daily and loss of pressure was recorded at the end of 100 hours and 500 hours.

Table VI indicates the results of this test.

TABLE VI

| Organo group | Pressure loss (lbs.) | |
| --- | --- | --- |
|  | 100 hrs. | 500 hrs. |
| 2-ethylhexyl: |  |  |
| 2% | 4 | 18 |
| 4% | 7 | 22 |
| Nonylphenyl: |  |  |
| 2% | 3 | 17 |
| 4% | 4 | 23 |
| Control | 32 | [1] >50 |

[1] Reached a 50 lb. pressure drop at 300 hrs. and for the control the test was terminated.

This example demonstrates that the compounds of the invention act as antioxidants in grease.

Having set forth the general nature and specific embodiments of the present invention, the true scope is now particularly pointed out in the appended claims.

What is claimed is:

1. A molybdenum-containing compound having the generic structure:

$$[(RO)_2PS-S]_2Mo_2S_2O_2$$

wherein R is an alkyl, cycloalkyl, aryl or alkaryl having 1 to 30 carbon atoms; said compound having antiwear and extreme pressure properties.

2. The compound according to claim 1 in which R is a $C_1$ to $C_{20}$ alkyl.

3. The compound according to claim 1 in which R is a $C_6$ to $C_{26}$ aryl.

4. The compound according to claim 1 in which R is isobutyl.

5. The compound according to claim 1 in which R is 2-ethylhexyl.

6. The compound according to claim 1 in which R is p-tertiary-butylphenyl.

7. The compound according to claim 1 in which R is nonylphenyl.

8. The compound according to claim 1 in which R is n-propyl.

9. The compound according to claim 1 in which R is n-amyl.

10. The compound according to claim 1 in which R is isopropyl.

11. A method for forming a compound having antiwear and extreme pressure properties which comprises reacting a neutralized molybdate solution with an organophosphorodithioic acid at a temperature of about 85° to 100° C. for about 1 to 5 hours using about 2 mols of the phosphorodithioic acid reactant for each mol of the molybdate reactant to provide a reaction product having the generic structure:

$$[(RO)_2PS-S]_2Mo_2S_2O_2$$

wherein R is an alkyl, cycloalkyl, aryl or alkaryl having 1 to 30 carbon atoms.

References Cited

UNITED STATES PATENTS 3,356,702  12/1967  Farmer et al. _____ 260—429

TOBIAS E. LEVOW, *Primary Examiner.*

A. P. DEMERS, *Assistant Examiner.*